US012470431B2

(12) United States Patent
Nguyen

(10) Patent No.: US 12,470,431 B2
(45) Date of Patent: Nov. 11, 2025

(54) SYSTEMS, APPARATUS, AND METHODS FOR CHANNEL ESTIMATION AND DATA DETECTION

(71) Applicant: San Diego State University Research Foundation, San Diego, CA (US)

(72) Inventor: Huu Ngoc Duy Nguyen, San Diego, CA (US)

(73) Assignee: San Diego State University Research Foundation, San Diego, CA (US)

( * ) Notice: Subject to any disclaimer, the term of this patent is extended or adjusted under 35 U.S.C. 154(b) by 447 days.

(21) Appl. No.: 18/174,555

(22) Filed: Feb. 24, 2023

(65) Prior Publication Data

US 2023/0275785 A1 Aug. 31, 2023

Related U.S. Application Data

(60) Provisional application No. 63/268,649, filed on Feb. 28, 2022.

(51) Int. Cl.
*H04L 25/02* (2006.01)
(52) U.S. Cl.
CPC ........ *H04L 25/0204* (2013.01); *H04L 25/021* (2013.01); *H04L 25/024* (2013.01); *H04L 25/0224* (2013.01)
(58) Field of Classification Search
CPC . H04L 25/0204; H04L 25/021; H04L 25/024; H04L 25/0224
See application file for complete search history.

(56) References Cited

U.S. PATENT DOCUMENTS

2016/0315791 A1* 10/2016 Barbu ................. H04L 25/0202

OTHER PUBLICATIONS

C. Jeon, R. Ghods, A. Maleki, and C. Studer, "Optimality of large MIMO detection via approximate message passing," in Proc. IEEE Int. Symp. Inform. Theory, 2015, pp. 1227-1231.
C. M. Bishop, Pattern recognition and machine learning. Springer, 2006.
D. L. Donoho, A. Maleki, and A. Montanari, "Message-passing algorithms for compressed sensing," Proc. National Academy of Sciences, vol. 106, No. 45, pp. 18 914-18 919, 2009. [Online]. Available: https://www.pnas.org/content/106/45/18914.
(Continued)

*Primary Examiner* — Natasha W Cosme
(74) *Attorney, Agent, or Firm* — Wang Hardoon, P.C.

(57) ABSTRACT

Systems, apparatus, and methods for channel estimation and data detection. In one exemplary embodiment, the data is obtained in a two-phase transmission structure that alternates known data with unknown data according to a regular or otherwise pre-determined time interval. Then, the receiver iteratively updates a postulated channel, and provides a predicted channel to the next time slot. Conceptually, the exemplary techniques iteratively improve its postulates for channel condition and data over multiple time slots. More directly, instead of linear detection and decoding of a pilot for channel estimation in each time slot, the exemplary techniques described herein use postulated channel conditions to attempt data detection and use the recovered data from data detection (unknown data) to re-postulate the channel conditions, etc. until channel conditions are stable and/or the next time slot is ready for processing.

20 Claims, 7 Drawing Sheets

(56) References Cited

OTHER PUBLICATIONS

D.-S. Shiu, G. Foschini, M. Gans, and J. Kahn, "Fading correlation and its effect on the capacity of multielement antenna systems," vol. 48, No. 3, pp. 502-513, Mar. 2000.
E. Bjornson, J. Hoydis, M. Kountouris, and M. Debbah, "Massive MIMO systems with non-ideal hardware: Energy efficiency, estimation, and capacity limits," IEEE Trans. Inform. Theory, vol. 60, No. 11, pp. 7112-7139, Nov. 2014.
F. Krzakala, A. Manoel, E. W. Tramel, and L. Zdeborov'a, "Variational free energies for compressed sensing," in Proc. IEEE Int. Symp. Inform. Theory, Honolulu, HI, USA, Aug. 2014, pp. 1499-1503.
F. Rusek, D. Persson, B. K. Lau, E. G. Larsson, T. L. Marzetta, O. Edfors, and F. Tufvesson, "Scaling up MIMO: opportunities and challenges with very large arrays," IEEE Signal Process. Mag., vol. 30, No. 1, pp. 40-60, Jan. 2013.
K. Takeuchi, "Bayes-optimal convolutional AMP," IEEE Trans. Inform. Theory, vol. 67, No. 7, pp. 4405-4428, May 2021.
L. Lu, G. Y. Li, A. L. Swindlehurst, A. Ashikhmin, and R. Zhang, "An overview of massive MIMO: Benefits and challenges," IEEE J. Select Areas in Commun., vol. 8, No. 5, pp. 742-758, Oct. 2014.
M. Bayati and A. Montanari, "The dynamics of message passing on dense graphs, with applications to compressed sensing," IEEE Trans. Inform. Theory, vol. 57, No. 2, pp. 764-785, Feb. 2011.
M. Bayati, M. Lelarge, and A. Montanari, "Universality in polytope phase transitions and message passing algorithms," The Annals of Applied Probability, vol. 25, No. 2, pp. 753-822, 2015. [Online]. Available: https://doi.org/10.1214/14-AAP1010.
M. J. Wainwright and M. I. Jordan, "Graphical models, exponential families, and variational inference," Found. Trends Mach. Learn., vol. 1, No. 1-2, pp. 1-305, Jan. 2008. [Online]. Available: https://doi.org/10.1561/2200000001.
S. Jaeckel, L. Raschkowski, K. Borner, and L. Thiele, "QuaDRiGa: A 3-D multi-cell channel model with time evolution for enabling virtual field trials," IEEE Trans. on Antennas and Propagation, vol. 62, No. 6, pp. 3242-3256, Jun. 2014.
S. Loyka, "Channel capacity of MIMO architecture using the exponential correlation matrix," IEEE Commun. Letters, vol. 5, No. 9, pp. 369-371, Sep. 2001.
S. Rangan, "Generalized approximate message passing for estimation with random linear mixing," in Proc. IEEE Int. Symp. Inform. Theory, 2011, pp. 2168-2172.
S. Rangan, P. Schniter, and A. K. Fletcher, "Vector approximate message passing," IEEE Trans. Inform. Theory, vol. 65, No. 10, pp. 6664-6684, May 2019.
S. S. Thoota and C. R. Murthy, "Variational Bayes' joint channel estimation and soft symbol decoding for uplink massive MIMO systems with low resolution ADCs," IEEE Trans. Commun., vol. 69, No. 5, pp. 3467-3481, May 2021.
W.-J. Choi, K.-W. Cheong, and J. Cioffi, "Iterative soft interference cancellation for multiple antenna systems," in Proc. IEEE Wireless Commun. and Networking Conf., vol. 1, 2000, pp. 304-309.

\* cited by examiner

SYSTEMS, APPARATUS, AND METHODS FOR CHANNEL ESTIMATION AND DATA DETECTION

PRIORITY

This application claims the benefit of priority to U.S. Provisional Patent Application Ser. No. 63/268,649 filed Feb. 28, 2022 and entitled "SYSTEMS, APPARATUS, AND METHODS FOR CHANNEL ESTIMATION AND DATA DETECTION", which is incorporated herein by reference in its entirety.

STATEMENT REGARDING FEDERALLY SPONSORED RESEARCH OR DEVELOPMENT

This invention was made with government support under Grant Number 2225576 awarded by the National Science Foundation. The government has certain rights in the invention.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of wireless communication. More particularly, the present disclosure relates to systems, computer programs, devices, and methods for channel detection and data detection.

DESCRIPTION OF RELATED TECHNOLOGY

Massive multiple-input multiple-output (MIMO) is one of the key enabling technologies in the emerging 5G networks to meet the user demand for higher data rate and better coverage. Via space division multiple access, a massive MIMO base-station (BS) can serve a large number of mobile-stations (MS) concurrently on the same time-frequency resource. However, the increase in the spatial dimension with a large channel matrix makes multiuser detection in massive MIMO a formidable task.

Massive MIMO detection has been a rich research topic in recent years with many contributions, offering different trade-offs between computational complexity and detection error performance. Conventional detection algorithms, such as those based on maximum a-posteriori probability (MAP) and maximum likelihood (ML) criteria which jointly recover all the symbols simultaneously, attain the optimal detection performance. However, their complexity increases exponentially in the number of users. Linear detectors, such as matched-filtering (MF), zero-forcing (ZF), linear minimum mean-squared error (LMMSE), rely on a simple linear preprocessing step to decorrelate the received signal, enabling separate symbol detection on a per-user basis. However, linear detection is strictly sub-optimal, compared to the optimal MAP/ML detector, especially in systems that have comparable numbers of transmit and receive antennas. This is because linear detectors simply treat the inter-user interference as noise. Interference cancellation is an attractive alternative solution, both in terms of complexity and performance. This family of nonlinear detectors enables separate detection and uses the removal of estimated symbols to facilitate the estimation of the remaining ones. While being prone to error propagation, the issue can be mitigated using soft detected symbols, resulting in the soft interference cancellation (SIC) method. Successive SIC using multiple iterations of symbol detection and interference cancellation can achieve near MAP/ML performance with manageable complexity.

Approximate message passing (AMP), originally developed as a computationally efficient algorithm for the recovery of sparse signals, has recently been proposed for massive MIMO detection. In a MIMO channel with independent and identically distributed (i.i.d.) Gaussian coefficients, AMP decouples the MIMO system into a set of parallel additive white Gaussian noise (AWGN) channels, and thus enables separate detection of user symbols. In addition, AMP was proved to achieve the minimum symbol error-rate (SER) performance for the large-system limit and showed a near-optimal performance in finite-dimensional systems. More importantly, the superior SER performance of AMP can be attained with very low-complexity computations. It is noted that the convergence of AMP is established through the algorithm's state evolution (SE) for i.i.d. Gaussian and i.i.d. sub-Gaussian channel matrix. However, when the channel matrix is ill-conditioned or has non-zero mean, the AMP algorithm may diverge. This issue has been partially tackled by the developments of recent AMP-like algorithms, such as Orthogonal AMP (OAMP) and Vector AMP (VAMP). It is worth noting that rigorous proofs of the SE in AMP algorithms are very technical in general and dependent on the statistics of the channel matrix, e.g., i.i.d. sub-Gaussian or unitarily invariant channels.

Recently, the MIMO detection problem has been tackled using the variational Bayes (VB) framework. VB is a powerful inference framework from machine learning that approximate intractable posterior distribution of latent variables with a known family of simpler distributions through optimization. Among VB methods, the mean-field approximation enables efficient optimization of the variational distribution over a partition of the latent variables, while keeping the variational distributions over other partitions fixed.

Unfortunately, conventional VB-based massive MIMO detectors that rely on noise variance knowledge yield poor error performance. Solutions for computationally efficient, closed-form implementation are needed. Ideally such solutions should provide comparable performance to AMP-based algorithms.

DETAILED DESCRIPTION

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Massive Multiple-Input Multiple-Output (MIMO) Operation

Figure 1:
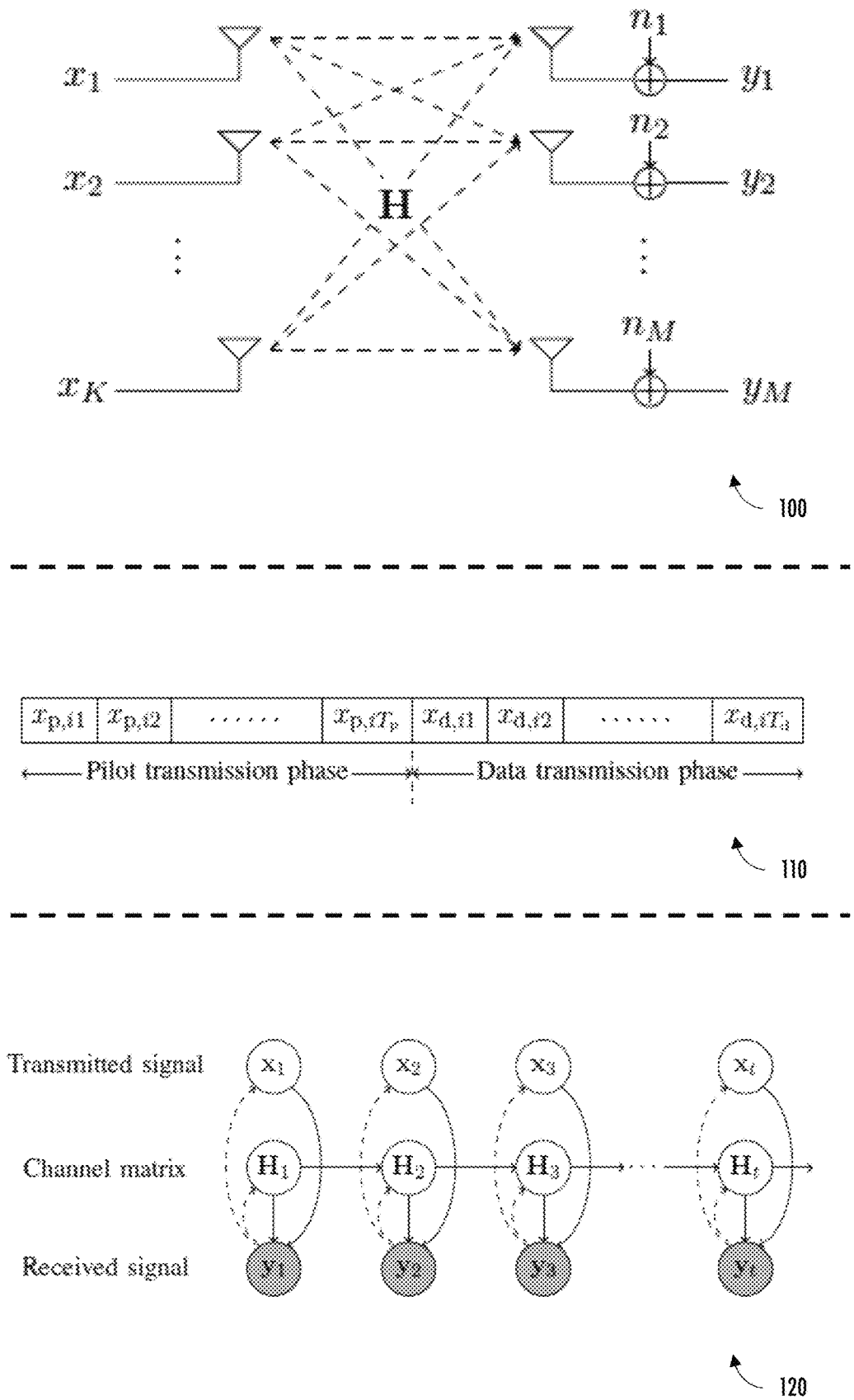
FIG. 1 is a logical block diagram of a multiple-input multiple-output (MIMO) communication system, a two-phase MIMO transmission, and a Bayesian network graphical model of a time-varying channel, useful to explain various aspects of the present disclosure.

FIG. 1 depicts a logical block diagram of a multiple-input multiple-output (MIMO) communication system 100, a two-phase MIMO transmission 110, and a Bayesian network graphical model of a time-varying channel 120, useful to explain various aspects of the present disclosure.

As shown in FIG. 1, the MIMO communication system 100 has K inputs and M outputs. The MIMO communication system 100 models an uplink channel with K single-antenna users, or an arbitrary number of multi-antenna users that produce a total of K un-precoded transmitted symbols from the users (collectively referred to as "users/antennas (i)".

The base-station has M antennas and is capable of jointly processing the received signal from all M antennas.

The MIMO communication system 100 uses a two-phase MIMO transmission 110, which includes a pilot transmission phase (pilot symbols $x_p$, at times $i_1, i_2, \ldots i_{T_p}$) and a data transmission phase (data symbols $x_d$, at times $i_1, i_2, \ldots i_{T_d}$).

During the pilot transmission phase, the K inputs correspond to the transmit signal vector: $x_{p,t}=[X_{p,1t}, \ldots X_{p,Kt}]^T \in \mathbb{C}^{K \times 1}$ at time slot t for $t=1, \ldots, T_p$. Since $H_{p,t} \in \mathbb{C}^{M \times K}$ represents the channel at time slot t, the linear uplink MIMO system may be represented as:

$$y_{p,t}=H_{p,t}x_{p,t}+n_{p,t} \text{ for } t=1, \ldots, T_p \qquad \text{EQN. 1}$$

Where, $y_{p,t} \in \mathbb{C}^M$ is the received signal and $n_{p,t} \sim \mathcal{CN}(0, N_0 I_M)$ models independent and identically distributed (i.i.d) additive Gaussian noise. The training matrix $X_{p,t}=[x_{p,t}, \ldots x_{p,T_p}] \in \mathbb{C}^{K \times T_p}$ is pre-determined and known at the base station. The base station uses the observed signal matrix $Y_{p,t}=[y_{p,t}, \ldots y_{p,T_p}] \in \mathbb{C}^{M \times T_p}$ to estimate the channel state information (CSI) $H_{p,t}$ during so-called "channel estimation".

During the data transmission phase, the K inputs correspond to the transmit signal vector: $x_{d,t}=[x_{d,1T}, \ldots x_{d,Kt}]^T \in \mathbb{S}^{K \times 1}$ at time slot t for $t=1, \ldots, T_d$. Since $H_{d,t} \in \mathbb{C}^{M \times K}$ represents the channel at time slot t, the linear uplink MIMO system may be represented as:

$$y_{d,t}=H_{d,t}x_{d,t}+n_{d,t} \text{ for } t=1, \ldots, T_d \qquad \text{EQN. 2}$$

Where $y_{d,t} \in \mathbb{S}^M$ is the received signal and $n_{d,t} \sim \mathcal{SN}(0, N_0 I_M)$ models the additive Gaussian noise. Each transmitted symbol $x_i$ from users/antennas (i) is drawn from a complex-valued discrete constellation ($\mathcal{S}$) which may be based on quadrature amplitude modulation (QAM) and phase shift keying (PSK).

Additionally, the prior distribution of symbol $x_i$ may be defined as:

$$x_i = \sum_{a \in S} p_a \delta(x_i-a) \qquad \text{EQN. 3}$$

Where $p_a$ corresponds to a known prior probability of the constellation point $a \in \mathcal{S}$, and the constellation is normalized such that $\mathbb{E}[x_i]=0$ and $\mathbb{E}[|x_i|^2]=1$. Unlike the pilot transmission phase, the data block $X_{d,t}=[X_{d,t}, \ldots x_{d,T_d}] \in \mathcal{S}^{K \times T_d}$ is unknown to the base station and must be estimated using the observed signal matrix $Y_{d,t}=[y_{d,t}, \ldots y_{d,T_d}] \in \mathbb{S}^{M \times T_d}$ during so-called "data detection."

While physical channels constantly change, small enough changes can be ignored without sacrificing quality (e.g., where the users are relatively stationary). In these so-called "block fading" scenarios, the channels $H_{p,t}$ and $H_{d,t}$ are treated as being identical for the transmission time ($T_p+T_d$). Time-invariant MIMO channels satisfy the condition: $H=H_{p,t}=H_{d,t} \forall t$; in other words, EQN. 1 and 2 of the two-phase MIMO transmission no can be re-written as:

$$; Y_p=HX_p+N_p \qquad \text{EQN. 4}$$

$$Y_d=HX_d+N_d \qquad \text{EQN. 5}$$

Where $N_p=[n_{p,t}, \ldots n_{p,T_p}] \in \mathbb{C}^{K \times T_p}$ and $N_d=[n_{d,t}, \ldots n_{d,t_d}] \in \mathbb{S}^{K \times T_d}$. One approach for signal processing block fading channels is to first estimate the channel matrix H as $\hat{H}$ and then use the estimated channel to $\hat{H}$ to estimate the data matrix $X_d$.

More generally however, time-varying channels may be modeled according to the Bayesian network graphical model of a time-varying channel 120. As shown in FIG. 1, the time-varying channel $H_t$ may be represented at time slot t by $H_t=[h_{1,t}, \ldots h_{K,t}]$, where $h_{i,t} \in \mathbb{C}^{M \times 1}$ is the uplink channel from users/antennas (i). Typically, the channel $h_{i,t}$ from users/antennas (i) at time slot t follows a first order Gauss-Markov model, which may be modeled as:

$$h_{i,0} = \beta_i^{\frac{-1}{2}} R^{\frac{1}{2}} g_{i,0} \qquad \text{EQN. 6}$$

$$h_{i,t} = \eta_i h_{i,t-1} + \sqrt{1-\eta_i^2}\,\beta_i^{\frac{-1}{2}} R^{\frac{1}{2}} g_{i,t} \text{ for } t=1,\ldots,T_p+T_d \qquad \text{EQN. 7}$$

Here R models the spatial correlation at the base station's antennas, $g_{i,t} \sim \mathcal{CN}(0, I_M)$ models the small-scale (time varying) fading coefficients, $\beta_i$ models the reciprocal of the large-scale fading coefficient (path-loss), and $\eta_i$ models the time correlation coefficient corresponding to the users/antennas (i). Under this model, error $\mathbb{E}[h_{i,t}h_{i,t}^H]=\beta_i^{-1}$ and $\mathbb{E}[h_{i,t-1}h_{i,t}^H]=\beta_i^{-1}\eta_i R$, $\forall t$. While the channel vector $h_{i,t}$ may vary from one time slot to the next time slot, most implementations assume that the statistics of $h_{i,t}$ vary very slowly. In other words, R, $\beta_i$, and $\eta_i$ are unchanged or change very slowly over the transmission time $(T_p+T_d)$. Notably, if $\eta_i=1$, $\forall i$ then the Gauss-Markov channel model is identical to the time-invariant block fading model described above. Additionally, existing implementations assume that both $\beta_i$, and $\eta_i$ are known by the base station; in practical implementations, these values may be derived using a two-phase MIMO transmission 110—i.e., pilot reception allows the base station to determine the large-scale fading coefficient based on the observed pilot attenuation as well as each antenna's relative time correlation difference based on the observed pilot shift (relative to the known pilot transmission).

Example Operation

Figure 2:
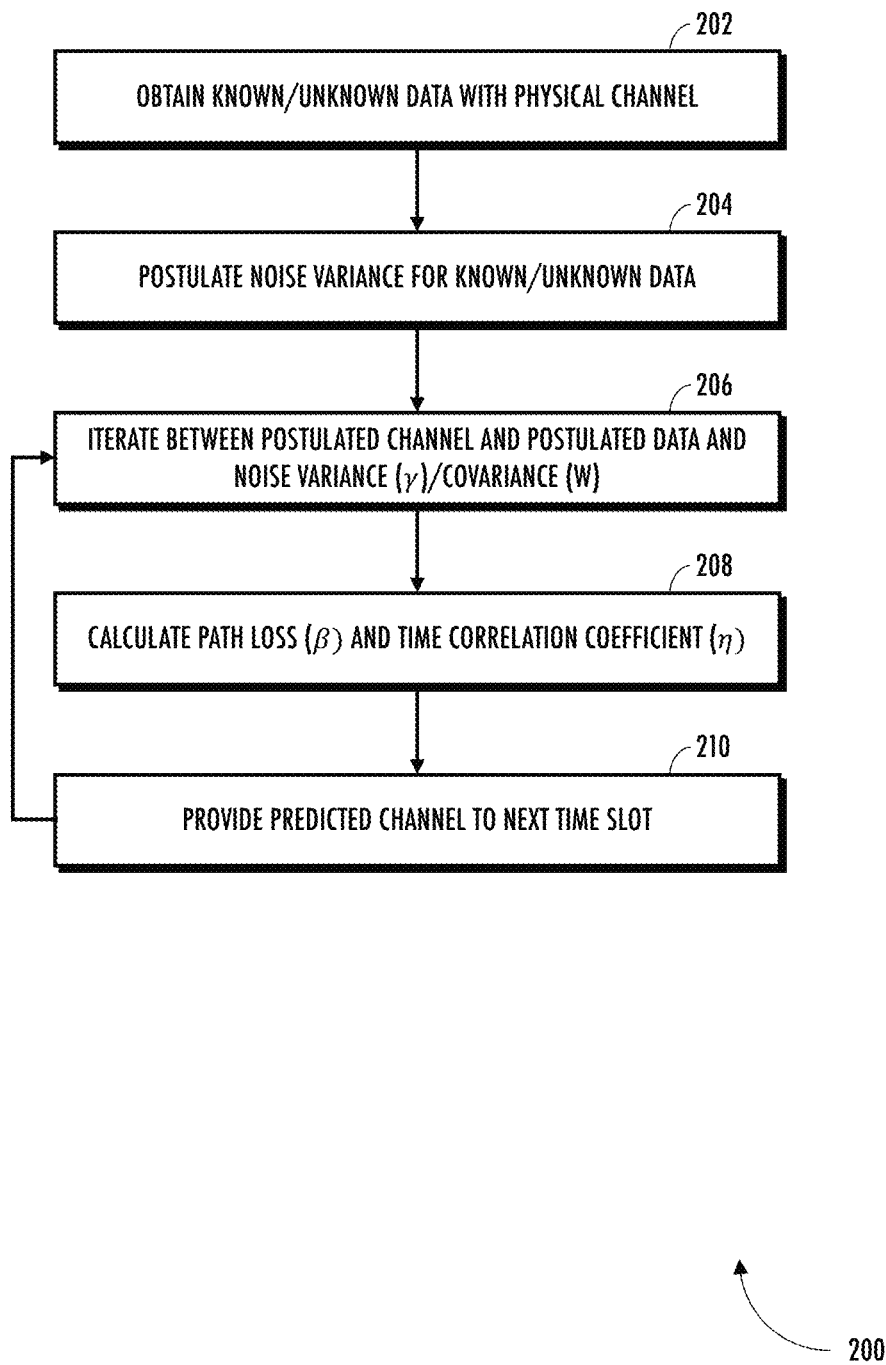
FIG. 2 is a graphical comparison of different Bayesian network graphical models, useful to explain various aspects of the present disclosure.

Referring now to FIG. 2, a logical flow diagram of a method 200 for channel estimation and data detection is shown. Unlike existing MIMO receivers which use linear detection and/or soft-interference cancelation (SIC) with known pilot transmissions to infer the channel state, the disclosed embodiments use a modified version of variational Bayes (VB) inference to postulate the channel state for data detection based on its previous channel state. While VB inference has been suggested for such applications, the complexity of using true posterior data is physically infeasible and/or computationally intractable for real-world applications. In other words, waiting to receive all symbols before decoding and responding cannot occur within the designated transmission time intervals; in addition, the computational complexity of linear detection and/or SIC exceeds mobile device processor capabilities (circa 2022).

In one embodiment, VB inference techniques are used in combination with a mean-field variational family of distributions that are specific to the MIMO application and which can be performed with partially known (or even unknown) data in real-time. In one exemplary embodiment, statistical learning algorithms are used to estimate $\beta_i$, $\eta_i$, as well as $h_{i,t}$ and $X_{d,it}$ corresponding to users/antennas (i), based on derived theorems and corollaries (EQNS provided below).

At step 202 of the method 200, a receiver obtains known and/or unknown data via a physical channel. In one exemplary embodiment, the receiver is a multiple-input multiple-output (MIMO) receiver comprising a plurality of antennas, a radio frequency (RF) to baseband (BB) front-end, and a digital baseband modem (modulator-demodulator). While the present disclosure is presented in the context of MIMO communication systems, other receiver structures may be substituted with equal success including without limitation: single-input single-output (SISO), multiple-input single-output (MISO), and single-input multiple output (SIMO), and/or other diversity configurations (including systems of antennas e.g., remote radio heads).

As used herein, "known" data refers to a signal representing data that the receiver can ascertain with certainty; for example, a pilot transmission corresponding to a pre-determined data payload. In one specific implementation, the known data may be used by the receiver to infer channel conditions (channel estimation). In contrast, "unknown" data refers to signal representing data that the receiver cannot ascertain with certainty; for example, a data transmission corresponding to users/antennas (i). In one specific implementation, the unknown data may be treated as data traffic (data detection).

Various embodiments of the present disclosure may infer actual channel conditions from unknown data based on statistical analysis (e.g., VB inference and/or mean-field approximation). As used herein, the terms "actual" and/or "physical" with reference to a "channel" refers to a communication link between endpoints. In contrast, the term "postulate", and its linguistic derivatives, refers to characteristics of the communication link that are assumed based on previous/subsequent data (prior/posterior), or estimated based on observed data, for iterative optimization. For example, the term "postulated channel estimation" refers to channel estimates that are assumed for at least one iteration of a channel estimation optimization analysis.

In one exemplary embodiment, the data is obtained in a two-phase transmission structure that alternates known data with unknown data according to a regular or otherwise pre-determined time interval. Other communication systems may transmit and receive known/unknown data according to an irregular or dynamically determined time interval. For example, an appropriately enabled MIMO communication system may transmit known data (e.g., a pilot) to initiate connectivity when requested (on an irregular basis). As but another example, an appropriately enabled MIMO communication system may transmit known data (e.g., a pilot) when data communication deteriorates below acceptable thresholds (on a dynamically determined basis). Still other embodiments may allow for single-phase transmission (i.e., all data is unknown).

As a brief aside, variational Bayes (VB) inference is a field of statistics that attempts to describe complex statistical models which often cannot be directly computed. Specifically, VB inference may be used to calculate a posterior p(x|y), described according to:

$$q(x) = \arg\min_{q(x) \in Q} KL(q(x)\|p(x|y)) \qquad \text{EQN. 7}$$

Where the Kullback-Leibler (KL) divergence is defined as:

$$KL(q(x)\|p(x|y)) = \mathbb{E}_{q(x)}[\ln q(x)] - \mathbb{E}_{q(x)}[\ln p(x|y)] \qquad \text{EQN. 8}$$

To reduce processing complexity, the present disclosure uses approximation techniques from so-called mean-field theory. One such variational family of distributions q(x) may be characterized as:

$$q(x) = \pi_{i=1}^m q^i(x_i) \qquad \text{EQN. 9}$$

Within the context of a MIMO communication system, the following conditions may additionally be assumed: let A, of size m×n, and x, of size n×1, be two independent random matrices (vectors) with a variational density of q(A,x)=q(A) q(x); and where A is column-wise independent, $\langle a_i \rangle$ and $\Sigma_{ai}$ are the variational mean and covariance matrix of the $i^{th}$ column of A; and where $\langle x \rangle$ and $\Sigma_x$=diag $(\sigma_{x_1}^2, \ldots, \sigma_{x_n}^2)$ are the variational mean and covariance matrix of x; and where B is a positive semi-definite matrix of size m×m and y is an arbitrary vector of size m×1. Consequently, the foregoing VB inference based on the mean-field variational distribution (EQN. 7-9) simplifies to the following theorems (EQN. 10-11), and a corollary (EQN. 12):

$$\langle x \rangle^H D \langle x \rangle = \Sigma_{i=1}^n |\langle x_i \rangle|^2 Tr\{B\Sigma_{ai}\} \quad \text{EQN. 10}$$

$$Tr\{D\Sigma_x\} = \Sigma_{i=1}^n \sigma_{x_i}^2 Tr\{B\Sigma_{ai}\} \quad \text{EQN. 11}$$

$$Tr\{\Sigma_{ai}\}=0, \forall i \quad \text{EQN. 12}$$

An exhaustive derivation of the equations used throughout is provided in APPENDICES A-B, each of which is incorporated herein by reference in its entirety.

Referring back to FIG. 2, at step 204, the receiver postulates an initial noise variance for the known and/or unknown data. Then, the receiver iteratively updates a postulated channel condition and a postulated data based on noise variance (γ) and covariance matrix (W), calculates a path loss (γ) and a time correlation coefficient (η), and provides a predicted channel to the next time slot (step 206, step 208, and step 210). Conceptually, the exemplary techniques described herein decouple channel estimation from known data (e.g., a pilot phase), and instead iteratively improve its postulates for channel condition and data over multiple time slots. More directly, instead of linear detection and decoding of a pilot for channel estimation in each time slot, the exemplary techniques described herein use postulated channel conditions to attempt data detection and use the recovered data from data detection (unknown data) to re-postulate the channel conditions, etc. until channel conditions are stable and/or the next time slot is ready for processing. The postulated channel conditions are carried forward into the next time slot, and the process is repeated.

In simulations of realistic reception scenarios, receiver performance rapidly converges to provide acceptable performance (e.g., depending on variation in large-scale fading coefficients (β) and small-scale fading coefficients (η)). Useful applications for the foregoing may include error-tolerant applications (where data can tolerate initial, or even ongoing, data errors) and/or relatively stable scenarios which do not experience rapid changes to channel conditions (applications such as IoT, IIoT, etc.) More generally, various aspects of the techniques described herein may be used to reduce network bandwidth for known signaling (e.g., pilot) and increase potential overall data capacity.

Two exemplary variations of the foregoing technique are discussed in greater detail: mean-field variational Bayes based data detection (MF-VB data detection) and linear minimum mean-squared error (LMMSE) variational Bayes based data detection (LMMSE-VB data detection).

In the first mean-field based variational Bayes (MF-VB) implementation, the noise variance may be postulated based on an arbitrary variable $N_0^{post}$ and its reciprocal $$\gamma = \frac{1}{N_0^{post}};$$

here, γ is a postuiatea precision of the noise variance. As a practical matter, γ may be selected based on the required precision—e.g., a larger γ corresponds to a larger noise variance precision, a smaller y corresponds to a smaller noise variance precision. The probability distribution function (PDF) of γ may be given by:

$$p(\gamma) = \frac{b_o^\gamma}{\Gamma(a_0)} \gamma^{a_0-1} e^{-b_0\gamma} \quad \text{EQN. 13}$$

Thus, a re-statement of the mean-field distribution (see EQN. 9) for this implementation may be expressed as:

$$p(x,y|\gamma,H) \approx q(x,\gamma) = \pi_{i=1}^K q_i(x_i) q(\gamma) \quad \text{EQN. b 14}$$

Where, the current "soft" estimate of the symbol $(x_j)$, $\forall j$ is given by:

$$z_i \triangleq \frac{h_i^H}{\|h_i\|^2} \left( y - \sum_{j \neq i}^K h_j \langle x_j \rangle \right) \quad \text{EQN. 15}$$

The variational density $q_i(x_i)$ may be calculated based on the variational mean $\langle x_i \rangle$ and associated variance $\sigma_{x_i}^2$; additionally, the variational density q(γ) may be calculated based on EQN. 13 above. Thereafter, a Co-ordinate Ascent Variational Inference (CAVI) technique may be used to iteratively estimate x and y by iteratively optimizing $q_i(x_i)$, $\forall i$ and then q(γ) (step 206). Notably, this implementation of VB inference uses a mean-field approximation $$\frac{h_i^H}{\|h_i\|^2}$$

to calculate the "soft" estimate of $z_i$, and is thus denoted MF-VB inference.

Figure 3:
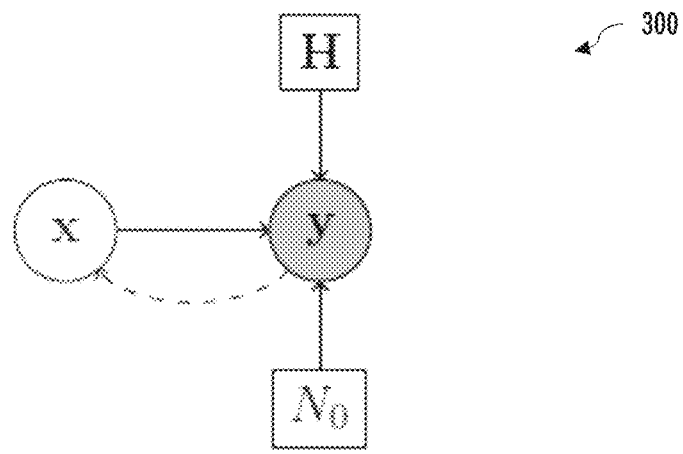
FIG. 3 is a logical flow diagram of an exemplary method for channel estimation and data detection, in accordance with the various principles described herein.
Figure 3:
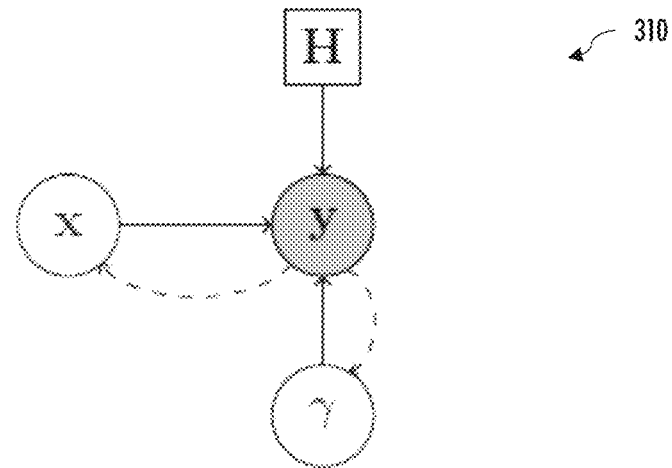
Figure 3:
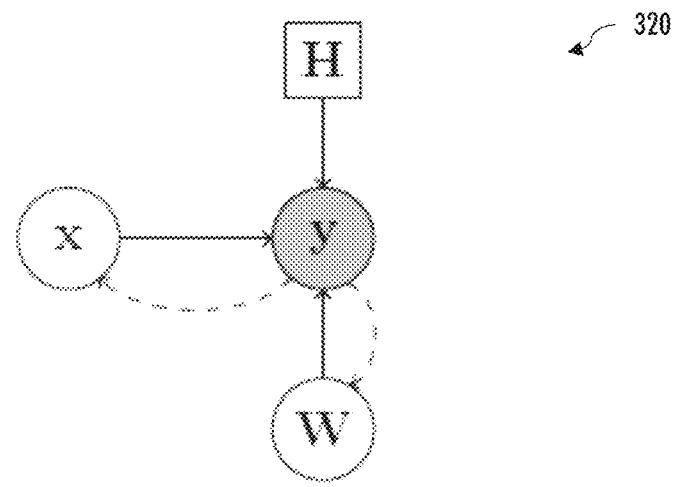

FIG. 3 graphically depicts the logical relationship between x, γ, y, and H for the first mean-field based variational Bayes (MF-VB) technique 310. For reference, the disclosed MF-VB inference techniques can be compared to existing VB inference techniques 300 which are based on x, $N_0$, y, and H. Conceptually, the existing VB inference techniques 300 fail to account for inter-user interference from previous estimations and assume a fixed $N_0$ (actual noise variance). In contrast, the exemplary MF-VB techniques 310 do not assume a fixed $N_0$, but instead use γ which is the reciprocal of the postulated noise variance (i.e., the precision of the noise variance). More directly, γ is not a fixed value and updates with successive interference calculations across the iterative optimization process for each time slot.

In the second LMMSE-VB data detection implementation, VB inference is used to estimate the input signal x using a postulated noise covariance matrix $C^{post}$ and its reciprocal $$W = \frac{1}{C^{post}};$$

here, W is a matrix of precision values with a complex Wishart distribution $\mathcal{CW}(W_0, n)$ for W where $W_0 \geq 0$ is the scale matrix, and n≥M is the degrees of freedom. The probability distribution function (PDF) of $W \sim \mathcal{CW}(W_0, n)$ is proportional to:

$$p(W) = |W|^{n-M} e^{-Tr\{W_0^{-1}W\}} \quad \text{EQN. 16}$$

Thus, a re-statement of the mean-field distribution (see EQN. 9) for this implementation may be expressed as:

$$p(x, W|y, H) \approx q(x, W) = \Sigma_{i=1}^{K} q_i(x_i) q(W) \quad \text{EQN. 17}$$

Where, $z_i$ is given by:

$$z_i \triangleq \langle x_i \rangle + \frac{h_i^H \langle W \rangle (y - H\langle x \rangle)}{h_i^H \langle W \rangle h_i} \quad \text{EQN. 18}$$

The variational density $q_i(x_i)$ may be calculated based on the variational mean $\langle x_i \rangle$ and associated variance $\sigma_{x_i}^2$, and the variational density $q(W)$ may be calculated based on EQN. 15 above. Like the first embodiment, CAVI techniques may be used to iteratively estimate x and W by iteratively optimizing $q_i(x_i)$, $\forall i$ and then $q(W)$ (step 206).

Referring back to FIG. 3, the logical relationship between x, W, y, and H for the second LMMSE-VB data detection technique 320 is also shown with reference to existing VB inference techniques 300 and the exemplary MF-VB techniques 310. Notably, the exemplary MF-VB techniques 310 allow for error accumulation as a vector (γ) but does not reflect correlation across multiple users/antennas (i); W is a matrix and thus can be used to approximate cross correlation across users/antennas (i) for better performance (at increased computational complexity i.e., $\mathcal{O}(\mathcal{N})^2$ complexity). As a related note, the inter-user interference cancelation and successive "whitening" of the postulated noise covariance matrix $C^{post}$ results in LMMSE-like approximations of $x_i$ which is why this variant is referred to as LMMSE-VB data detection.

Figure 4:
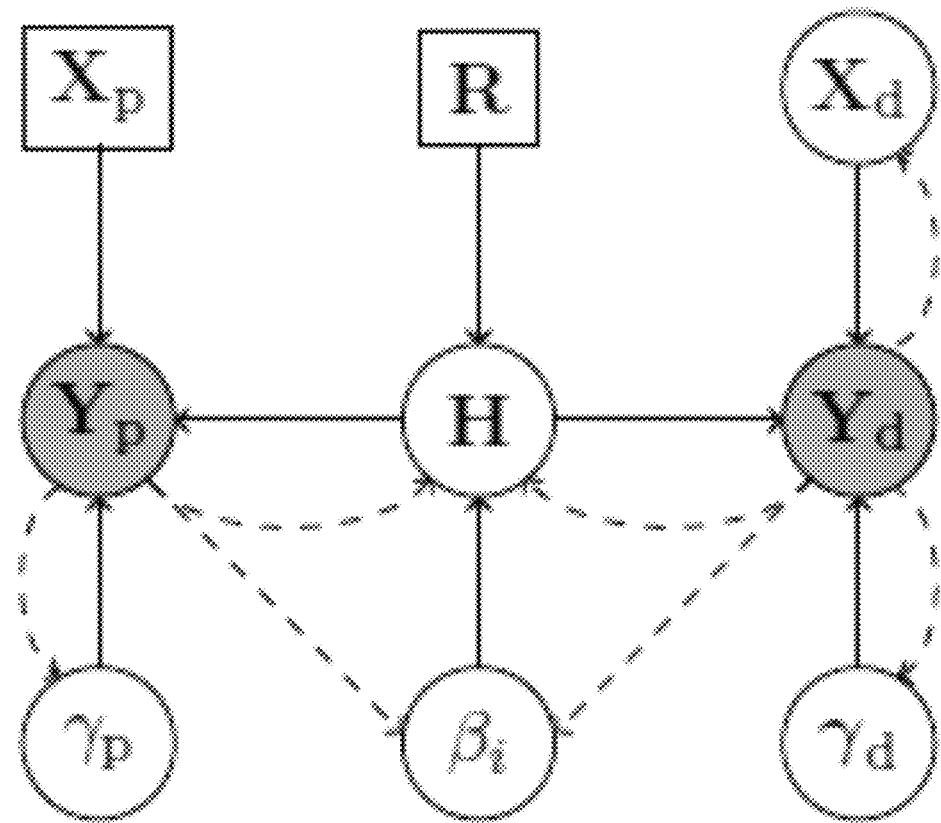
FIG. 4 depicts a two-phase MIMO transmission according to a Bayesian network graphical model of a time-invariant channel with unknown large-scale fading coefficients (β), in accordance with the various principles described herein.
Figure 5:
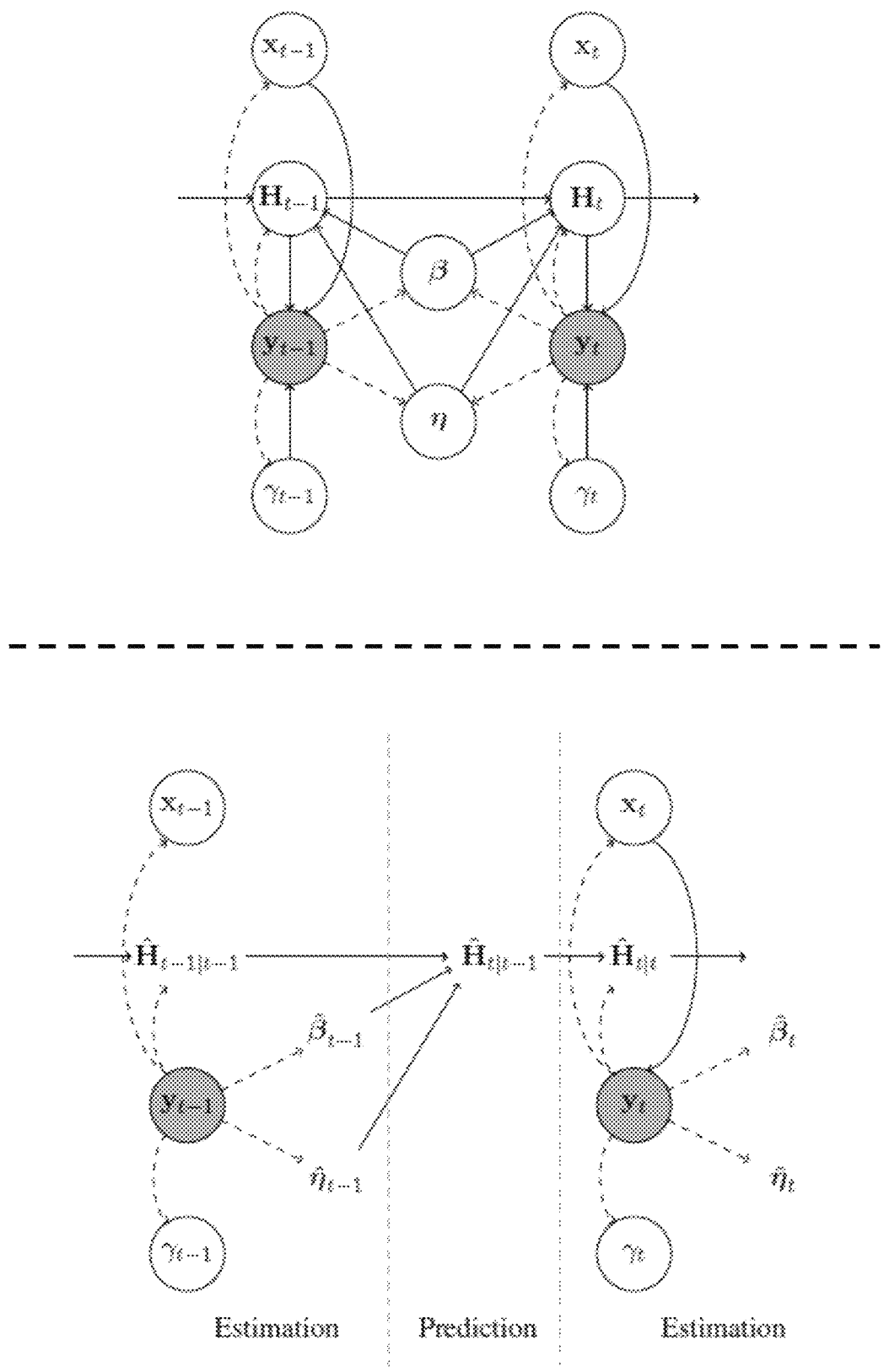
FIG. 5 depicts a generalized multi-phase MIMO transmission according to a Bayesian network graphical model of a time-varying channel with unknown large-scale fading coefficients (β) and unknown time correlation coefficients (η), in accordance with the various principles described herein.

Referring now to FIGS. 4-5, the foregoing techniques are discussed with reference to joint channel estimation and data detection (JED) (previously alluded to as step 208 of FIG. 2).

FIG. 4 depicts a two-phase MIMO transmission according to a Bayesian network graphical model of a time-invariant channel with unknown large-scale fading coefficients (β), in accordance with the various principles described herein. In one specific implementation, MF-VB inference is used to provide a JED of the postulated physical channel (H) and the postulated data matrix ($X_d$). During operation, the receiver obtains observed signals ($Y_p$, $Y_d$), along with the known pilot symbols ($X_p$), antenna configuration parameters ($R_i$), and prior distribution $p(s_i)$, $\forall i$. The MF-VB inference postulates the unknown data symbols ($X_d$), along with a postulated channel (H), the postulated noise ($\gamma_p$, $\gamma_d$), and large-scale fading coefficients ($\beta_i$). Here, the postulated noise for known and unknown symbols are considered separately ($\gamma_p$, $\gamma_d$) but the large-scale fading coefficients ($\beta_i$) are assumed to be the same.

During operation, the postulated variational density of the channel $q_{h_i}(h_i)$ may be postulated based on a Gaussian random vector characterized by the covariance matrix ($\Sigma h_i$) and mean ($\langle h_i \rangle$), described:

$$\Sigma_i = [(\langle \gamma_p \rangle T_p + \Sigma_{t=1}^{T_d} \langle \gamma_{d,t} \rangle (|x_{d,it}|^2)) I_m + \langle \beta_i \rangle R^{-1}]^{-1} \quad \text{EQN. 19}$$

$$\langle h_i \rangle = \Sigma_i [\langle \gamma_p \rangle Y_p x_{p,i}^* + \Sigma_{t=}^{T_d} \langle \gamma_{d,t} \rangle (y_{d,t} - \Sigma_{j \neq i}^{K} \langle h_j \rangle \langle x_{d,jt} \rangle) \langle x_{d,it}^* \rangle] \quad \text{EQN. 20}$$

Additionally, the postulated variational density of the data $q(x_{d,it})$ may be approximated by:

$$q(x_{d,it}) \propto p(x_{d,it}) e^{\{-\langle \gamma_{d,t} \rangle \|\langle h_i \rangle\|^2 |x_{d,it} - z_{d,it}|^2 - \langle \gamma_{d,t} \rangle Tr(\Sigma i) |x_{d,it}|^2\}} \quad \text{EQN. 21}$$

Where $$z_{d,it} \triangleq \frac{h_i^H}{\|h_i\|^2} \left( y_{d,t} - \sum_{j \neq i}^{K} h_j \langle c_{d,jt} \rangle \right)$$

is a linear estimate of $X_{d,it}$ which can be normalized to obtain the variational distribution of $q(x_{d,it})$, as well as the resulting mean ($\langle x_{d,it} \rangle$) and variance ($\sigma_{x_i}^2$) with respect to $q(x_{d,it})$.

Finally, $\langle \gamma_p \rangle$, $\langle \gamma_{d,t} \rangle$ may be calculated according to:

$$\langle \gamma_p \rangle = \frac{a_0 + MT_p}{b_0 + \|Y_{p,t} - \langle H \rangle X_p\|_F^2 + T_p \sum_{i=1}^{K} Tr\{\Sigma i\}} \quad \text{EQN. 22}$$

$$\langle \gamma_{d,t} \rangle = \frac{a_0 + M}{b_0 + \langle \|y_{d,t} - H x_{d,t}\|^2 \rangle} \quad \text{EQN. 23}$$

The process is repeated until the postulated values (e.g., $X_d$, H, $\gamma_p$, $\gamma_d$) for the time slot converge, or alternatively, acceptable values according to data recovery requirements.

More generally, the foregoing techniques may be broadly extrapolated to time-varying channels. FIG. 5 depicts a generalized multi-phase MIMO transmission according to a Bayesian network graphical model of a time-varying channel with unknown large-scale fading coefficients (β) and unknown time correlation coefficients (η), in accordance with the various principles described herein. As shown, the physical channel (H) and the postulated unknown data matrix (X) are depicted with two separate time intervals t and t−1.

During operation, the receiver obtains observed signals (Y), and the prior distribution $p(s_i)$, $\forall i$. The online JED postulates the unknown data symbols ($X_d$), along with a postulated time-varying channel ($H_t$), the postulated noise ($\gamma_t$), large-scale fading coefficients ($p_i$), and small-scale fading coefficients ($\eta_i$). In this example, there are no known signals; fading is generalized to only large-scale effects (average amplitude over time slots t and t−1) and small-scale effects (correlation between time slots t and t−1).

In these applications, a pilot in a first time slot, may be used to predict channel conditions for subsequent time slots (transmitted without pilots). In some cases, even unknown signaling may be used after a convergence point (e.g., where the postulated channel condition correctly predicts actual channel condition for a time slot).

Reception is split into at least an estimation phase and a prediction phase. During the estimation phase, a variational density of the channel $q_{h_i}(h_i)$ and the data $q(x_{d,it})$ may be postulated relative to a previous time slot. The resulting means and variances of the variational density may be used to calculate large-scale (path loss) fading coefficients ($\beta_i$), and small-scale (time varying) fading coefficients ($\eta_i$). The process may be iterated until the new time slot converges. The corresponding equations for calculations are provided as follows (complete derivations may be found in APPENDICES A-B):

$$\Sigma_{i,t} = \left[\langle\gamma_t\rangle\langle|x_{i,t}|^2\rangle I_M + \langle\beta_i\rangle\hat{R}_{i,t-1|t-1}^{-1}\right]^{-1} \quad \text{EQN. 24}$$

$$\langle h_{i,t}\rangle = \quad \text{EQN. 25}$$

$$\sum_{i,t}\left[\langle\gamma_t\rangle\left(y_t - \sum_{j\neq i}^{K}\langle h_{j,t}\rangle\langle x_{j,t}\rangle\right)\langle x_{i,t}^*\rangle - \langle\beta_i\rangle\langle\eta_i\rangle\hat{R}_{i,t-1|t-1}^{-1}\hat{h}_{i,t-1|t-1}\right]$$

$$q(x_{i,t}) \propto p(x_{i,t})e^{\{-\langle\gamma_t\rangle(\|\langle h_{i,t}\rangle\|^2|x_{i,t}-z_{i,t}|^2)+Tr\{\Sigma_{i,t}\}|x_{i,t}|^2\}} \quad \text{EQN. 26}$$

$$a_i = a_{i,t-1} + M \quad \text{EQN. 27}$$

$$b_{i,t} = b_{i,t-1} + (\langle h_{i,t}\rangle - \eta_i\hat{h}_{i,t-1|t-1})^H \hat{R}_{i,t-1|t-1}^{-1}(\langle h_{i,t}\rangle - \langle\eta_i\rangle\hat{h}_{i,t-1|t-1}) + \quad \text{EQN. 28}$$

$$Tr\left\{\sum_{i,t}\hat{R}_{i,t-1|t-1}^{-1}\right\} + \sigma_{\eta_i}^2\hat{h}_{i,t-1|t-1}^H\hat{R}_{i,t-1|t-1}^{-1}\hat{h}_{i,t-1|t-1}$$

$$\sigma_{\eta_i}^{-2} = \langle\beta_i\rangle\hat{h}_{i,t-1|t-1}^H\hat{R}_{i,t-1|t-1}^{-1}\hat{h}_{i,t-1|t-1} + \sigma_{\eta_i,t-1}^{-2} \quad \text{EQN. 29}$$

$$\langle\eta_i\rangle = \sigma_{\eta_i}^2\left(\mathcal{R}\left\{\frac{\langle\beta_i\rangle\hat{h}_{i,t-1|t-1}^H\hat{R}_{i,t-1|t-1}^{-1}\langle h_{i,t}\rangle}{\hat{h}_{i,t-1|t-1}^H\hat{R}_{i,t-1|t-1}^{-1}\hat{h}_{i,t-1|t-1}}\right\} + \frac{\hat{\eta}_{i,t-1}}{\sigma_{\eta_i,t-1}^2}\right) \quad \text{EQN. 30}$$

$$\langle\gamma_t\rangle = \frac{a_\gamma + M}{b_\gamma + \langle\|y_t - H_t x_t\|^2\rangle} \quad \text{EQN. 31}$$

Overview of System Architecture

Figure 6:
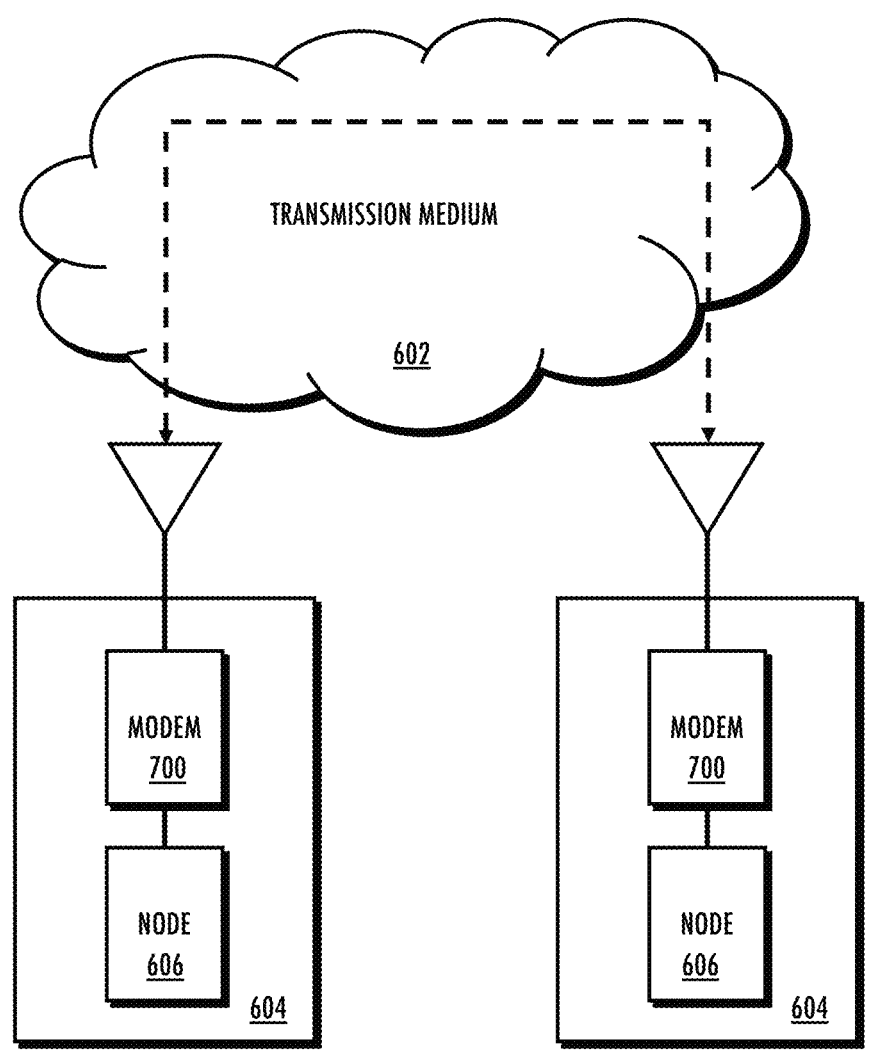
FIG. 6 depicts a logical block diagram of an exemplary communication system.

FIG. 6 is a logical block diagram of a communication system 600. The communication system 600 may include: a transmission medium 602 and a plurality of communication devices 604. Logically, each communication device 604 may be further subdivided into a node 606 and a modulator/demodulator (modem subsystem 700). Wireless technologies do not require a physical medium to transmit electromagnetic signals, however, as a practical matter, wireless signals propagate through air which may affect the channel characteristics based on e.g., humidity, temperature, etc.

While the illustrated system is depicted as a point-to-point connection, virtually any number of devices and/or topologies may be substituted with equal success. "Network topology" refers to the physical or logical arrangement of devices that make up a network. There are several different types of network topologies; some of the most common network topologies include, without limitation: bus, star, ring, mesh, tree, and/or hybrids of the foregoing. For example, a cellular base station may use a "star" topology to service multiple user equipment. As another example, a Wi-Fi mesh network may allow multiple devices to connect in a more fluid, arbitrary manner.

The following discussion provides a functional description for the communication devices 604. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical subsystems of the communication devices 604 is separately provided below.

Functional Description of Communication Device

Figure 7:
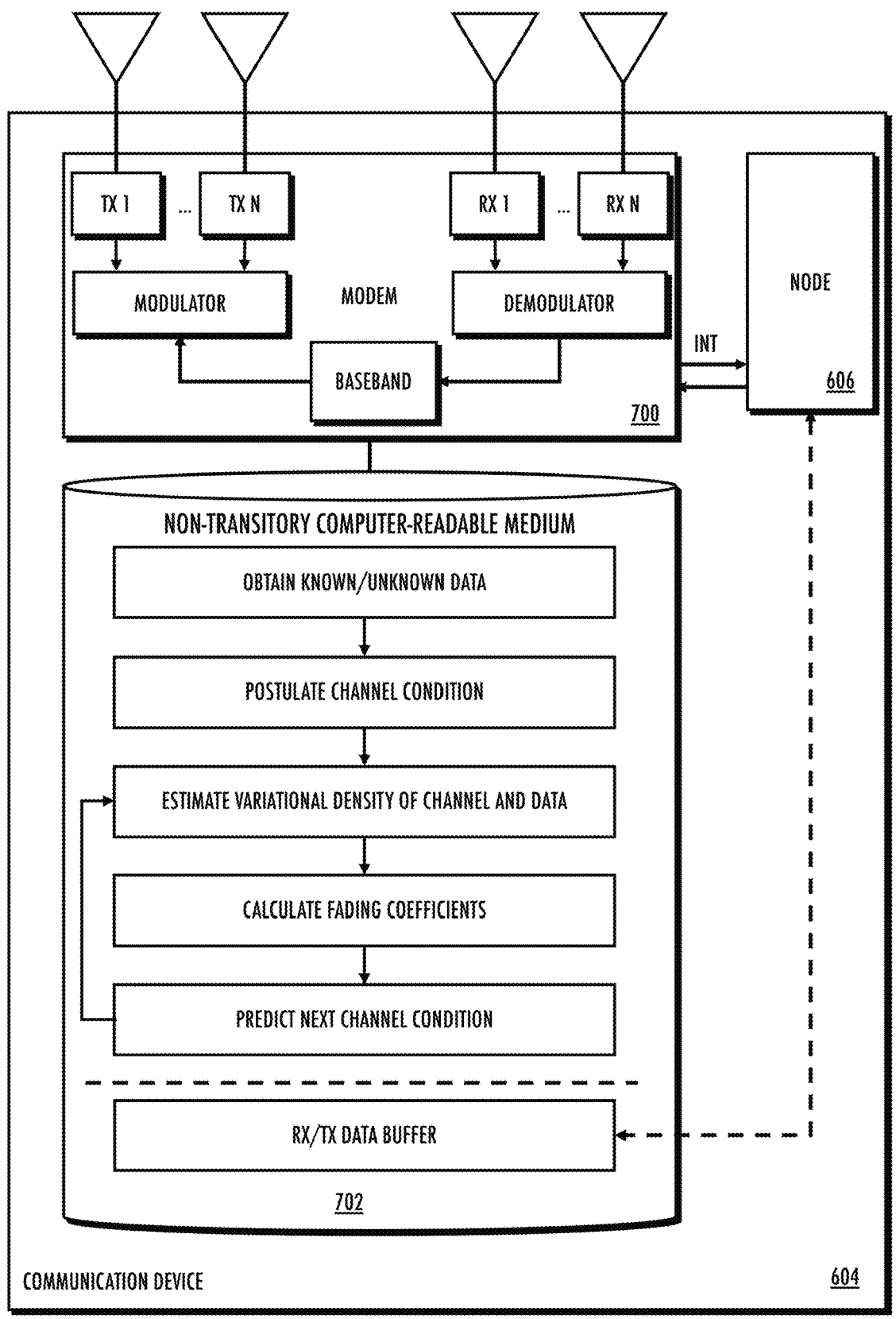
FIG. 7 depicts a logical block diagram of an exemplary communication device.

FIG. 7 is a logical block diagram of a communication device 604. The communication device 604 may include: a plurality of transmit and receive antennas, a modem subsystem 700, a memory subsystem 702, and a node 606. Common examples of communication devices may include, without limitation, cellular devices and base stations, Wi-Fi stations and access points, Bluetooth endpoints, Internet of Things (IoT) devices, and/or any other wireless communication device.

Functionally, a communication device 604 (of e.g., communication system 600 of FIG. 6) enables a logical endpoint of communications (the node 606) to communicate with at least one other node. Most modern communication systems allow nodes to be addressable by other nodes; this allows for complex networks and sub-networks. Communication in networks may be unicast (node-to-node), multicast (node-to-multiple-nodes), and/or broadcast (node-to-any-node). In some communication networks, a unit of data (a data packet) may be routed across multiple nodes of the communication network in "hops" (a segment between two nodes).

Node Subsystem

The node 606 of the communication device may generate data (a source node) or consume data (a sink node); usually, a node may operate as both a source and sink of data. Typically, a node is associated with a logical set of tasks; different nodes may have different tasks and/or capabilities. For example, a user device may be treated as a single node, however, a base station might have multiple nodes (e.g., a distributed unit (DU), distributed unit (CU), router, etc.).

As shown in FIG. 7, the node 606 reads and writes data from buffers of the memory subsystem 702. The node may directly write to the data buffers using e.g., direct memory accesses (DMAs), etc. In packet-switched networks, data is segmented and transferred as "packets" and over the network. The packets can take different routes to their destination, and they may arrive out of order. The destination device reassembles the packets into their original order to reconstruct the original data. Packet-switched delivery allows for efficient use of network resources and enables reliable communication over a wide range of distances. By breaking up data into smaller packets, network devices can transmit the data more quickly and efficiently, while also providing error checking and correction to ensure that the data is transmitted accurately.

Data packets contain at least a header and a payload. The header contains information about the packet such as: the source and destination addresses, packet length, and sequence number. This information is used by other network nodes to route the packet to its destination and ensure that the data is delivered correctly. The payload contains the actual data that is being transmitted, such as a file, email message, or web page. The size of the payload can vary depending on the type of data being transmitted and the network protocol being used.

Common examples of nodes in a communication network include without limitation: clients, servers, routers, switches, hubs, access points, gateways. For example, a user's smart phone may have a client node that communicates with a server node hosted elsewhere on the Internet. To communicate, the smart phone modem may need to transmit data packets to an intermediate base station modem, which in turn routes data packets via a backhaul network of switches, gateways, and routers, etc.

Modem Subsystem

Logically, the modem subsystem 700 may be subdivided into a modulator and radio transmitter front end, a demodulator and radio receiver front end, and a baseband processor. During operation, a modem transmits data (signal) by modulating digital data into waveforms for transmission. To receive data, the modem demodulates waveforms to recover the original signal.

Signal recovery/noise removal is a collaborative process between modems. The modulation of the transmitting modem may be adjusted to improve demodulation at the receiving modem. Additionally, the receiving modem may also provide feedback to the transmitting modem, such that the transmitting modem may correctly adjust for channel conditions.

Modem: Modulator and Demodulator Subsystems

The modulator and demodulator logic are typically self-contained as dedicated logic or hardware. For most consumer devices (smart phones, smart watches, computers), the modem front end may be implemented as application specific integrated circuits (ASICs) that offer low power and high performance. Commercial infrastructure may have performance, parallelism, re-programmability, and/or security requirements that are better handled with dedicated processing logic and/or field-programmable gate arrays (FPGAs).

Functionally, "modulation" refers to the process of varying a carrier signal in some way to encode information that can be transmitted over a communication channel. For example, a modulator may mix a message signal (e.g., voice, video, or data) with a carrier signal of higher frequency to produce a modulated signal that can be transmitted over a communication channel. There are several characteristics of a signal that can be modulated: amplitude, frequency, phase, etc. Basic modulation techniques directly encode data e.g., amplitude modulation (AM), frequency modulation (FM), and phase modulation (PM). More complex modulation techniques modulate multiple different characteristics at once; for example, 16-QAM and 64-QAM modify amplitude and phase to create a signal constellation that represents multiple bits of data.

"Demodulation" refers to the process of decoding information from a varying carrier signal received via a communication channel. At the receiver, the demodulation process is used to extract the original information signal from the modulated carrier signal. Unfortunately, the process of demodulation is often much more difficult than modulation since the original signal is unknown.

As previously noted, the transmission medium and/or internal components of the communication devices 604 introduce noise. Each channel of a diversity configuration experiences slightly different channel conditions due to e.g., reflections, refractions, and diffractions of the signal as it travels through the transmission medium. More directly, a 2×2 MIMO system has 4 different noise characteristics, a 4×4 MIMO system may have 16 different noise characteristics, etc. Receive diversity often requires that the demodulator: searches for a common time reference among the channels, estimates the channel effects (CHEST), removes the corresponding channel effects from the signal, and extracts the signal from the noise. Since the extracted signal may have multiple corruptions, the signal may additionally be corrected with forward error correction techniques (e.g., Viterbi coding, Turbo coding, etc.). For a variety of reasons, the demodulator may rely on higher protocol layers and collaborative network control (handled in the modem baseband) to accomplish this task.

Modem: Baseband Subsystem

Generally, the modem baseband is composed of one or more processors operating that execute instructions stored in a memory subsystem. More generally however, other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

Functionally, the modem baseband handles a communication protocol stack that enables collaborative network operation. As but one such example, one exemplary protocol stack might be logically subdivided into: a Physical layer (PHY), a Medium Access Control layer (MAC), a Radio Link Control layer (RLC), a Packet Data Convergence Protocol layer (PDCP), a Radio Resource Connection layer (RRC), and a Transmission Control Protocol/Internet Protocol layer (TCP/IP). Each layer of the protocol stack communicates with its logical counterpart in another device; for example, the PHY layer of a base station (BS) communicates with the PHY layer of the user equipment (UE), the MAC layer of a BS communicates with the MAC layer of the UE, etc. Each layer additionally provides a level of abstraction to the layer above it; for example, the PHY layer handles physical transmission functionality so that the MAC layer does not need to, etc. While the following example is discussed in the context of a specific communication stack, virtually all modern digital communications systems (Wi-Fi, Bluetooth, RFID, IoT, etc.) use an analogous communication stack organization.

The RRC layer controls the radio connection. The RRC typically handles mobility management and/or IP connectivity. Additionally, radio bearers are established, maintained, and released via an RRC connection. Other RRC functionality may include key management, establishment, configuration, maintenance, and release of point-to-point radio bearers. The RRC layer relies on the RLC layer to manage data transfer over the radio bearer.

The RLC layer manages data transfer within logical channels of data. The RLC handles error correction, concatenation, segmentation, and reassembly of data according to the logical channels. In some cases, the RLC may also re-segment, reorder, detect duplicates, and/or discard data, etc. The RRC layer relies on the MAC layer to transport the logical channels of data.

The MAC layer maps logical channels to physical transport channels. This entails multiplexing logical channels onto transport blocks (TB) that can be delivered over the physical resources of the network. The MAC layer also manages error correction, dynamic scheduling, and logical channel prioritization. The MAC layer relies on the PHY layer to physically transmit the transport blocks over physical resources.

The PHY layer transfers information from transport channels over the air interface. The PHY layer handles link adaptation, power control, link synchronization, and physical measurements. Some technologies allow for flexible air interface configuration with a dynamic transmission time interval (TTI) and/or resource block assignments, etc. to achieve different radio link characteristics.

Memory Subsystem

The memory subsystem 702 is composed of non-transitory computer-readable medium that may be used to store data locally at the communication device 604. Data may be stored as non-transitory symbols (e.g., bits, bytes, words, and/or other data structures). In one specific implementation, the memory subsystem is realized as one or more physical memory chips (e.g., NAND/NOR flash) that are logically separated into memory data structures. The memory subsystem may be bifurcated into program code and/or program data. In some variants, program code and/or program data may be further organized for dedicated and/or collaborative use. For example, the receive and transmit data buffers may be shared between the node 606 and the modem subsystem 700 to facilitate large transfers of data.

In one embodiment, the program code includes instructions that when executed by the modem subsystem 700 cause the modem subsystem 700 to perform tasks which may include: calculations, and/or actuation of the modulator, demodulator, and/or baseband. In some embodiments, the program code may be statically stored within the communication device 604 as firmware. In other embodiments, the program code may be dynamically stored (and changeable) via software updates. In some such variants, software may be subsequently updated by external parties and/or the user, based on various access permissions and procedures.

In one exemplary embodiment, the non-transitory computer-readable medium includes a channel estimation and data detection routine. When executed by the modem subsystem 700, the channel estimation and data detection routine causes the modem subsystem to: obtain data; postulate a condition of a channel; estimate a variational density of the channel and/or data; calculate fading coefficients; and predict the next condition of the channel.

Various aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method, comprising:
   obtaining a first known data and a first unknown data from a first time slot;
   postulating a first channel condition;
   recovering a first recovered data from the first unknown data based on the first channel condition;
   estimating a second channel condition based on the first recovered data;
   obtaining a second unknown data from a second time slot; and
   recovering a second recovered data from the second unknown data based on the second channel condition.

2. The method of claim 1, further comprising:
   calculating a noise variance for the second channel condition based on a first mean-field variational Bayes approximation of a first probability distribution of the first unknown data and the first recovered data; and
   updating the noise variance for a third channel condition based on a second mean-field variational Bayes approximation of a second probability distribution of the second unknown data and the second recovered data.

3. The method of claim 1, further comprising:
   calculating a noise covariance matrix for the second channel condition based on a first variational Bayes approximation of a first probability distribution of the first unknown data and the first recovered data; and
   updating the noise covariance matrix for a third channel condition based on a second variational Bayes approximation of a second probability distribution of the second unknown data and the second recovered data.

4. The method of claim 1, further comprising:
   estimating a third channel condition based on the second recovered data; and
   determining whether the second channel condition and the third channel condition converge.

5. The method of claim 1, where the first known data and the first unknown data are obtained according to a two-phase multiple-input multiple-output time slot; and
   where the first known data comprises a pilot signal and the first unknown data comprises first data traffic.

6. The method of claim 5, where a second known data and the second unknown data are obtained according to the two-phase multiple-input multiple-output time slot; and
   where the second known data comprises the pilot signal and the second unknown data comprises second data traffic.

7. The method of claim 5, j the second unknown data is obtained without an other pilot signal.

8. An apparatus, comprising:
   a modem front end;
   a processor; and
   a non-transitory computer-readable medium comprising instructions which when executed by the processor, causes the processor to:
   obtain unknown data via a channel in a first time slot;
   postulate a first condition of the channel in the first time slot;
   estimate a variational density of the channel or the unknown data;
   calculate a fading coefficient based on the variational density; and
   predict a second condition of the channel in a second time slot based on the fading coefficient.

9. The apparatus of claim 8, where the modem front end comprises a multiple-input multiple-output modem front end and the channel comprises a two-phase structure comprising a known pilot and the unknown data.

10. The apparatus of claim 8, where the first condition comprises a noise variance based on a mean-field variational Bayes approximation of the channel or the unknown data.

11. The apparatus of claim 8, where the first condition comprises a noise covariance matrix based on a variational Bayes approximation of the channel.

12. The apparatus of claim 8, where the fading coefficient comprises a path loss fading coefficient and a time varying fading coefficient.

13. The apparatus of claim 8, where the instructions further cause the processor to:
    estimate a new variational density of the channel based on the second condition;
    calculate a new fading coefficient based on the new variational density; and
    predict a third condition of the channel in a third time slot based on the new fading coefficient.

14. The apparatus of claim 13, where the instructions further cause the processor to determine whether the variational density and the new variational density converge.

15. A method for channel estimation and data detection, comprising:
    obtaining unknown data via a channel in a first slot;
    postulating a first condition of the channel in the first slot;
    recovering data from the unknown data and the first condition;
    estimating a fading coefficient based on the recovered data; and
    predicting a subsequent condition of the channel in a subsequent slot.

16. The method of claim 15, where the first slot comprises a known signal and the subsequent slot does not comprise the known signal.

17. The method of claim 15, where the first condition comprises a first noise variance postulated from a mean-field variational Bayes approximation of the channel in the first slot, and the subsequent condition comprises a subsequent noise variance postulated from the mean-field variational Bayes approximation of the channel in the subsequent slot.

18. The method of claim 15, where the first condition comprises a first noise covariance matrix postulated from a variational Bayes approximation of the channel in the first slot, and the subsequent condition comprises a subsequent noise covariance matrix postulated from the variational Bayes approximation of the channel in the subsequent slot.

19. The method of claim 15, where predicting the subsequent condition of the channel occurs in a next slot.

20. The method of claim 15, where predicting the subsequent condition of the channel in the subsequent slot iteratively occurs over multiple slots.

* * * * *